United States Patent
Ballantyne et al.

(10) Patent No.: US 10,584,980 B2
(45) Date of Patent: Mar. 10, 2020

(54) SENSING DEVICE, CLOSURE DEVICE COMPRISING SAID SENSING DEVICE AND METHOD FOR MANUFACTURING SAID SENSING DEVICE

(71) Applicant: Alpinestars Research SRL, Coste di Maser (Treviso) (IT)

(72) Inventors: Colin Ballantyne, Asolo (IT); Giovanni Mazzarolo, Coste di Maser (IT)

(73) Assignee: ALPINESTARS RESEARCH SRL, Coste di Maser (Treviso) (IT)

( * ) Notice: Subject to any disclaimer, the term of this patent is extended or adjusted under 35 U.S.C. 154(b) by 356 days.

(21) Appl. No.: 15/520,123

(22) PCT Filed: Nov. 3, 2015

(86) PCT No.: PCT/EP2015/075519
§ 371 (c)(1),
(2) Date: Apr. 19, 2017

(87) PCT Pub. No.: WO2016/071309
PCT Pub. Date: May 12, 2016

(65) Prior Publication Data
US 2017/0314963 A1 Nov. 2, 2017

(30) Foreign Application Priority Data
Nov. 4, 2014 (IT) .............................. TV2014A0156

(51) Int. Cl.
*H01H 9/00* (2006.01)
*G01D 5/14* (2006.01)
(Continued)

(52) U.S. Cl.
CPC ............... *G01D 5/14* (2013.01); *A41D 1/002* (2013.01); *A41F 1/00* (2013.01); *A41F 1/004* (2013.01);
(Continued)

(58) Field of Classification Search
CPC ........................ G01D 5/14; A41F 1/002–008
(Continued)

(56) References Cited

U.S. PATENT DOCUMENTS 6,226,842 B1 * 5/2001 Wong ..................... A41F 1/002
24/303
7,205,872 B2 * 4/2007 Baechle ............... H01H 27/007
335/205

(Continued)

FOREIGN PATENT DOCUMENTS

| FR | 2750577 A1 | 1/1998 |
| WO | 2004091330 A2 | 10/2004 |
| WO | 2014001189 A1 | 1/2014 |

OTHER PUBLICATIONS

PCT International Search Report and Written Opinion dated Feb. 2, 2016 for Intl. App. No. PCT/EP2015/075519, from which the instant application is based, 10 pgs.

*Primary Examiner* — Alexander Talpalatski
(74) *Attorney, Agent, or Firm* — Fredrikson & Byron, P.A.

(57) ABSTRACT

The present invention relates to a sensing device (10) designed for being applied on a first flap (11) and on a second flap (12) of an opening (13) arranged in a wearable item (14). The sensing device (10) comprises: a triggering element (20) arranged on the first flap (11) of the opening (13) and comprising an activating component (23); a switch element (30) arranged on the second flap (12) of the opening (13) and comprising a sensing component (33); the sensing component (33) being designed for emitting an electrical
(Continued)

output signal when it is put in a predetermined mutual position with respect to the activating component (23). According to the invention the triggering element (20) is provided with at least one alignment component (22; 22A, 22B) designed for interacting with a corresponding alignment component (32; 32A, 32B) of the switch element (30) so as to autonomously and automatically put in said predetermined mutual position the activating component (23) and the sensing component (33) when the first flap (11) is drawn close to the second flap (12), or viceversa. The invention also relates to a closure device comprising said sensing device (10) and to a method for manufacturing said sensing device (10).

17 Claims, 7 Drawing Sheets (51) Int. Cl.
| | |
|---|---|
| *A41D 1/00* | (2018.01) |
| *A41F 1/00* | (2006.01) |
| *A44B 13/00* | (2006.01) |
| *A44B 19/24* | (2006.01) |
| *B29C 51/12* | (2006.01) |
| *B29K 105/04* | (2006.01) |
| *B29K 105/00* | (2006.01) |
| *B29L 31/48* | (2006.01) |

(52) U.S. Cl.
CPC .............. *A41F 1/008* (2013.01); *A44B 13/00* (2013.01); *A44B 19/24* (2013.01); *G01D 5/145* (2013.01); *A41D 2300/322* (2013.01); *A41D 2400/44* (2013.01); *B29C 51/12* (2013.01); *B29K 2023/06* (2013.01); *B29K 2105/04* (2013.01); *B29K 2105/256* (2013.01); *B29L 2031/48* (2013.01)

(58) Field of Classification Search
USPC ......................................................... 335/205
See application file for complete search history.

(56) References Cited

U.S. PATENT DOCUMENTS

| | | |
|---|---|---|
| 8,106,733 B2 * | 1/2012 | Nakasuji ............ H01H 36/0066 219/457.1 |
| 2002/0005340 A1 | 1/2002 | Marmaropoulos et al. |
| 2007/0008714 A1 * | 1/2007 | Kilfedder ................ A44B 19/24 362/103 |
| 2007/0236361 A1 | 10/2007 | Farhadian |
| 2007/0285231 A1 | 12/2007 | Leftly et al. |
| 2015/0287561 A1 * | 10/2015 | Levesque ........... A45C 13/1069 190/100 |

* cited by examiner

SENSING DEVICE, CLOSURE DEVICE COMPRISING SAID SENSING DEVICE AND METHOD FOR MANUFACTURING SAID SENSING DEVICE

RELATED APPLICATIONS

This application is a 35 U.S.C. 371 national stage filing from International Application No. PCT/EP2015/075519, filed Nov. 3, 2015, which claims priority to Italian Application No. TV2014A000156, filed Nov. 4, 2014, the teachings of which are incorporated herein by reference.

The present invention relates to a sensing device. In particular, the present invention relates to a sensing device adapted to supply an electrical output signal. More in particular, the present invention relates, even if in a non-exclusive way, to a sensing device adapted to be positioned at the opening of a garment and suitable for emitting an electrical output signal when the opening is correctly closed. The invention also relates to a closure device comprising said sensing device and to a method for manufacturing said sensing device.

It is known that the term 'wearable technology' is often associated with garments which have electronic devices inside them. These may be for entertainment, or alternatively to look after the safety of the user.

One way to look after the safety of the user is to be able to deploy protective measures in the event that a high risk situation is detected, for example by inflating an airbag. However for allowing the airbag to work correctly, the garment needs to be closed properly, otherwise the protection may be compromised.

For example, one of the most common ways to close a garment is to use a zip. In this case, for assuring an adequate level of safety, it must be understood that when the zip is completely closed, or closed sufficiently in order to guarantee the correct functioning of any safety systems which may be present.

US2002/0005340 discloses a zip fastener designed for indicating to the user when the zip has reached a certain position. However, this implementation has some problems since it requires wiring to be installed on each side of the zip in order to close the circuit. Moreover, it is difficult to directly connect the wires to the zip, due to the small dimensions of the teeth.

Figure 1:
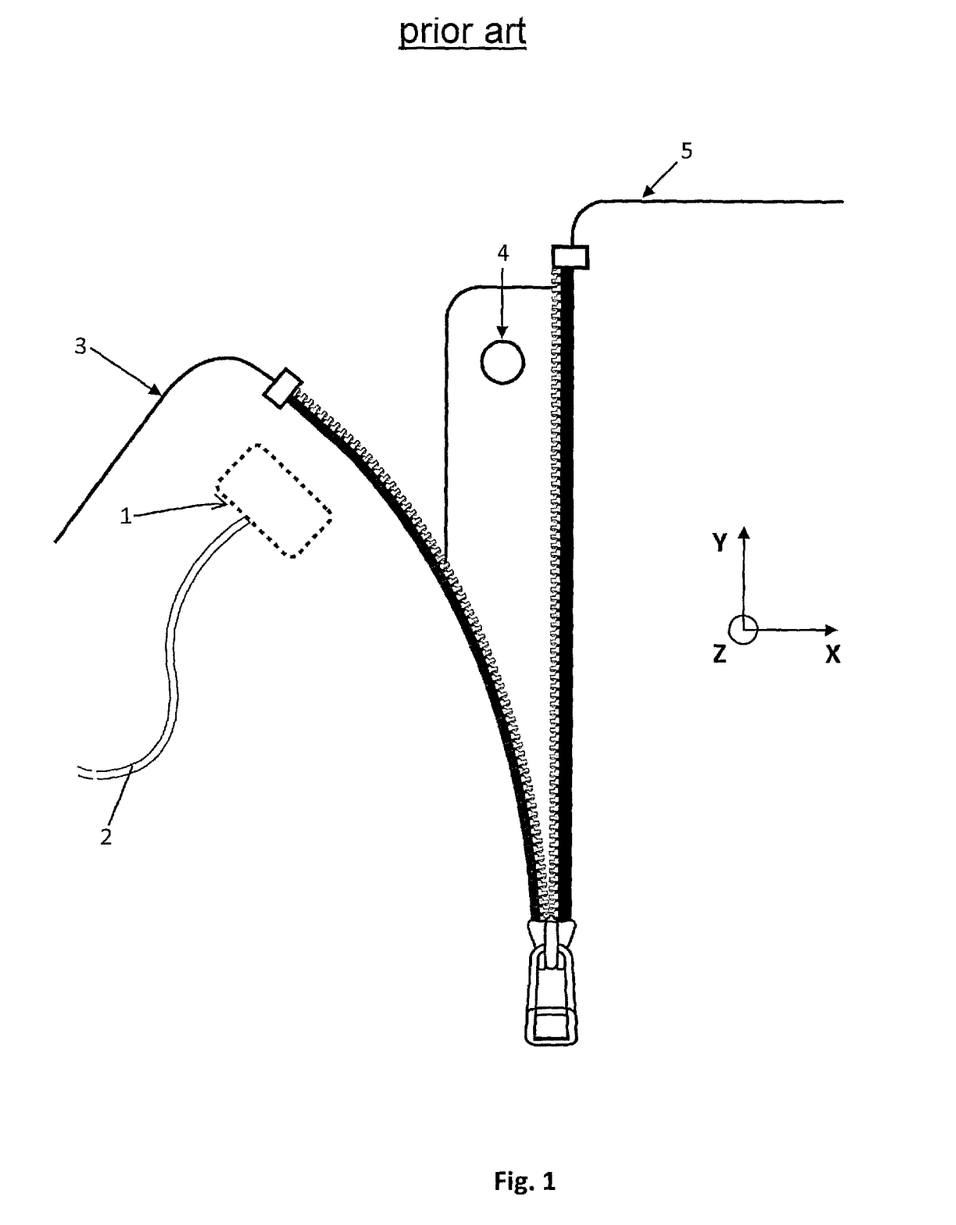
FIG. 1 shows a partial front view of a known zip closure provided with a reed switch.

One alternative that eliminates wiring on both sides of the zip is to use a reed switch (or similar sensor, such as a Hall effect sensor). In this case there is wiring on only one side of the zip and a magnet is applied on the opposite side of the zip. FIG. 1 shows a traditional zip which implements this sensing method, wherein the sensor 1 provided with the wire 2 is put on a first side 3 of the closure and the magnet 4 is put on a second side 5 of the zip. Such solution is disclosed for example in WO2014001189 filed by the same applicant.

Even if such solution is greatly appreciated, care must be taken to ensure that the flap with the magnet is in continuous contact or if not in contact, very close to the sensing element. As a matter of fact, most reed switches can only detect the magnet if it is closer than 3-5 mm to the sensor.

When the garment is tight fitting, this is most often achieved because the fit naturally pushes the magnet close to the sensor, but if the garment has the incorrect size, or loose fitting, the distance between the flap and the magnet can exceed the detection distance, thereby signalling that the garment is open, even if the garment is actually correctly closed.

One possible way to overcome this drawback would be to apply fastening means, like for example Velcro or stud fastener, to join or hold the flap close to the outer of the garment. However, as well as adding cost, these additional fasteners would then have to be fastened by the user, who in most cases will not bother to fasten them because the garment is already closed adequately using only the zip.

The above example outlines when the sensor and magnet are out of range on the z axis, however the problem is not exclusive to this axis, it is also important that the magnet and sensor are aligned on the x and y axis.

Provided the flap is small (less than 20 mm) the x, y alignment is often maintained, however the problem is that tight tolerances are required during manufacture to ensure that the x, y position of the sensor and magnet are within the tolerance (more or less 3 millimetres) needed for allowing the sensor to detect the presence of the magnet in the beginning. Such tolerances are not easy to be achieved with the manual labour used to stitch (either by hand or machine) the components in the correct position.

The object of the present invention is to provide a sensing device which solves at least partially the above mentioned problems and drawbacks.

In particular, an aim of the present invention is to provide a sensing device suitable for providing a reliable signal when it is positioned in a predetermined position.

Moreover, another aim of the present invention is to provide a sensing device which is easy to operate, not hindering the user.

A further aim of the present invention is to provide a sensing device suitable for being used with all garment types.

Another aim of the present invention is to provide a method for manufacturing such sensing device.

These and other objects and aims are achieved by the sensing device according to claim 1, by the closure device according to claim 9 and by the method according to claim 11.

The advantages and the characteristic features of the invention will emerge more clearly from the following description of a preferred, but not exclusive, embodiment of the sensing device which refers to the accompanying figures in which.

With reference to the attached figures, an example of a sensing device according to the invention is indicated as a whole by the reference 10.

The sensing device 10 is designed for being applied on a first flap 11 and on a second flap 12 of an opening 13 arranged in a wearable item 14. The first flap 11 and the second flap 12 are preferably designed for being superimposed to each other.

Figure 7:
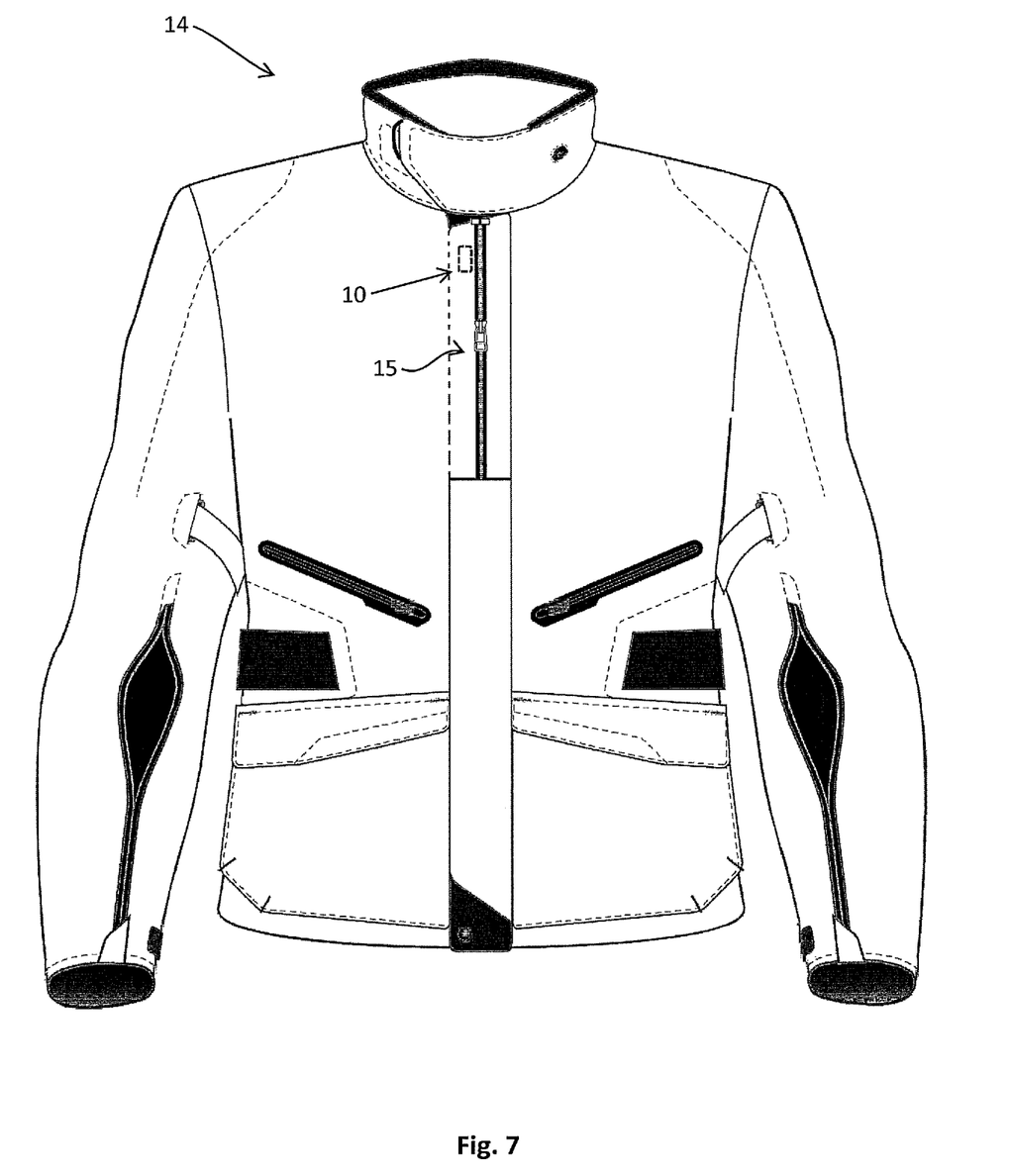
FIG. 7 shows a schematic view of a garment comprising a sensing device according to the invention.

In the following description, as "wearable item" there will be indicated a garment, like for example a jacket (see FIG. 7, wherein for sake of clarity the flap covering a zip closure 15 has been partially removed), a suit, a pair of trousers, a glove, and the like, but also an item of footwear or a protective device, like for example a helmet, a chest protector and similar.

The sensing device 10 comprises a triggering element 20 which is arranged on the first flap 11 of the opening 13 and comprises an activating component 23.

Moreover, the sensing device 10 comprises a switch element 30 which is arranged on the second flap 12 of the opening 13 and comprises in its turn a sensing component 33.

The sensing component 33 is designed for emitting an electrical output signal when it is put in a predetermined mutual position with respect to the activating component 23 of the triggering element 20.

In detail, such predetermined mutual position corresponds to the mutual position of the sensing component 33 and activating component 23, including a functional tolerance, that allows the sensing component 33 to be put into operation.

According to the invention, the triggering element 20 is provided with at least one alignment component 22 designed for interacting with a corresponding alignment component 32 of the switch element 30.

The function accomplished by the alignment component 22, in cooperation with the corresponding alignment component 32, is to autonomously and automatically put in the predetermined mutual position the activating component 23 and the sensing component 33 when the first flap 11 is drawn close to the second flap 12 or, which is the same, when the second flap 12 is drawn close to the first flap 11.

As "autonomously and automatically" it should be intended that the alignment components 22, 32 allow to put the activating component 23 and the sensing component 33 in their mutual predetermined position without needing any action from the user of the wearable item, to which the sensing device is applied, or without being operated from external components, positioned for example on the wearable item.

Firstly the structure of the triggering element 20 is disclosed.

Figure 2:
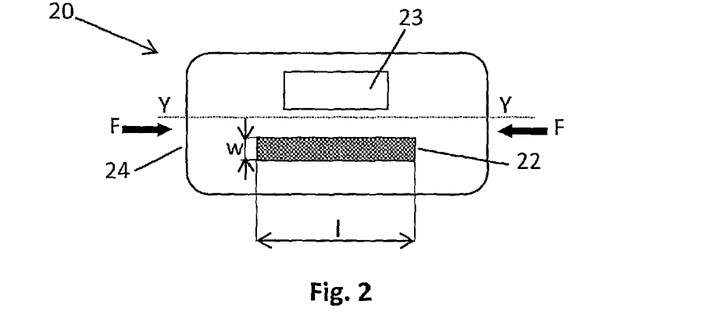
FIGS. 2, 4, 12-14 show schematic views of different embodiments of a first element of the sensing device according to the invention.

According to the embodiment of FIG. 2, the triggering element 20 can comprise an activating component 23 and one single alignment component 22. The activating component 23 can be positioned along a direction substantially parallel to the longitudinal axis Y of the triggering element 20. The alignment component 22 in its turn can be positioned substantially parallel to the activating component 23. Preferably the alignment component 22 has a substantially rectangular shape, having a length 1 and a width w.

Figure 4:
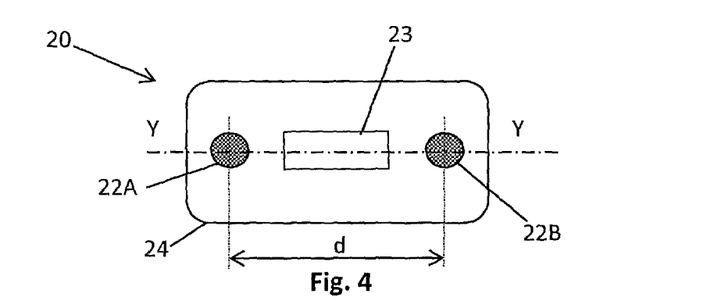

Alternatively, as shown in FIG. 4, the triggering element 20 can comprises an activating component 23 and two alignment components 22A, 22B.

Preferably the alignment components 22A, 22B have a substantially circular shape. The alignment components 22A, 22B can be positioned on the triggering element 20 so that their centres lie on the longitudinal axis Y of the triggering element 20, being spaced apart of a fixed distance d.

Preferably, in this embodiment the activating component 23 has a rectangular shape and is positioned along the longitudinal axis Y of the triggering element 20. In this embodiment, the alignment components 22A, 22B are positioned in proximity of the side end of the activating component 23.

Figure 12:
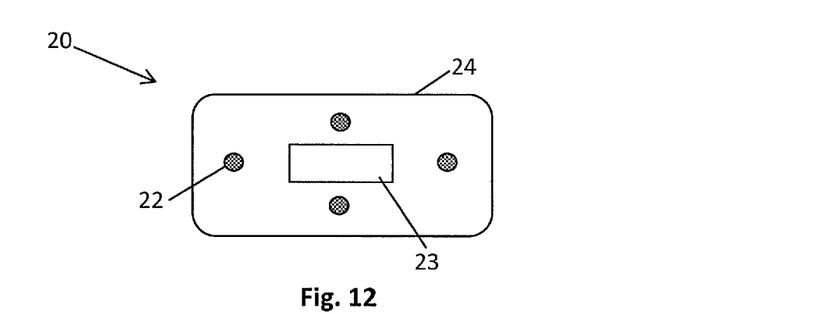
Figure 13:
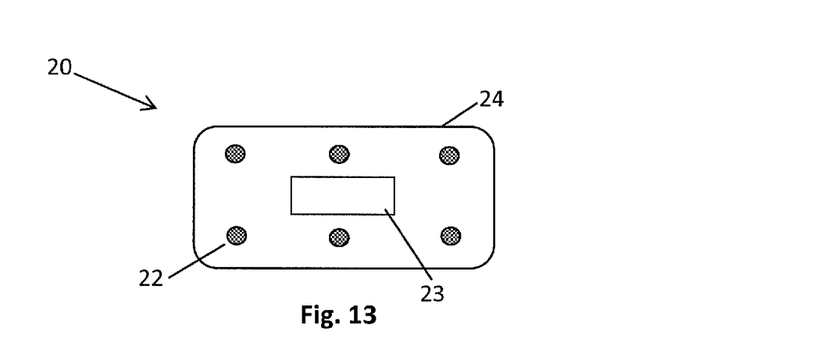
Figure 14:
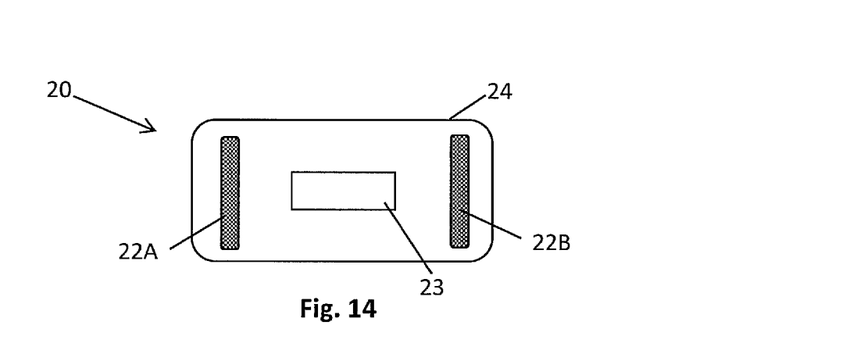

In FIGS. 12-14 other embodiments of the triggering element 20 are shown.

According to the invention, it is possible to provide triggering element 20 with more than two alignment components 22 (see for example FIGS. 12-13) or with two alignment components 22A, 22B having a different shape and orientation with respect to that shown in FIG. 4.

Obviously, different arrangements of the activating component 23 and/or of the alignment components 22A, 22B are possible, in order to meet other specific needs.

Preferably, each alignment component 22 of the triggering element 20 is a magnetic component. The magnetic poles of the alignment component 22 are axially oriented and they are designed for generating electromagnetic field strength sufficient such that a duplicate magnet of the same strength can be attracted within a predetermined distance. Preferably such distance is set to about 1.5-2.0 cm.

Preferably, the activating component 23 is a magnetic component suitable for being positioned in proximity of the switch element 30 so as to put into operation the sensing component 33. In this case, the sensing component 33 can be a magnetic proximity sensor; for example a reed sensor or a Hall effect sensor or similar sensor.

Preferably the triggering element 20 comprises a backing layer 24 which has the function to retain the components of the triggering element 20 in place.

The backing layer 24 preferably is made with a sufficiently stiff material such that if a longitudinal force F is applied, as shown in FIG. 2, it does not cause the element to bow excessively.

Figure 6:
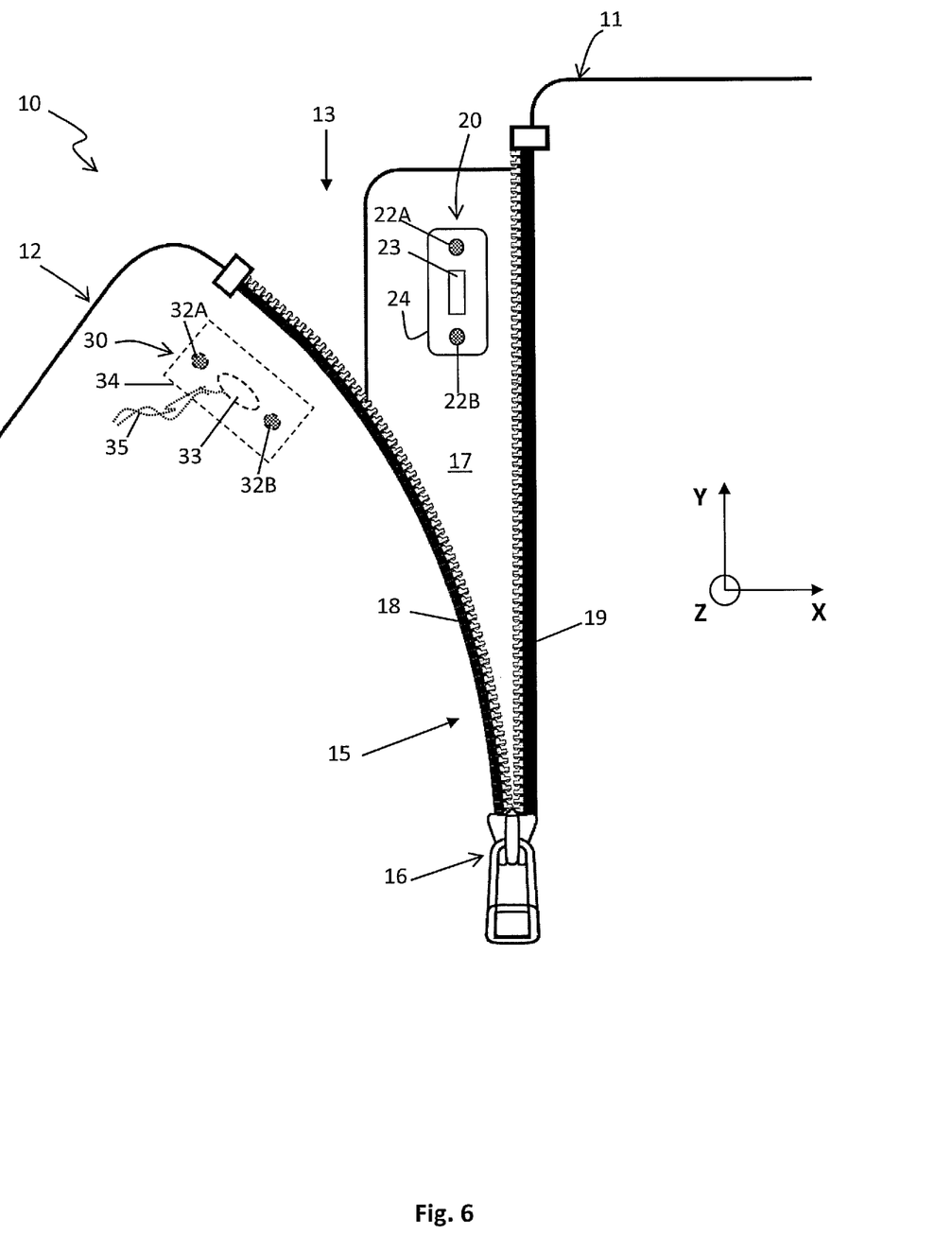
FIG. 6 is a view similar to the one of FIG. 1 showing an embodiment of the sensing device of the invention in use.

The triggering element 20, as shown in FIG. 6, might be installed at the top of a zip closure 15, for example near the collar of the user. A backing layer 24 with a proper stiffness prevents that the triggering element 20 and the switch element 30 are separated to each other outside the detection tolerance, following a compressive force, like for example that originates by a forward bending of the user's neck.

Preferably the backing layer 24 is made with at least two polymeric foam sheets coupled to each other; for example two polyethylene foam sheets 27.

Experimental tests carried out by the applicant have shown that a thickness of the backing layer comprised between 0.7-1.5 mm provides the stiffness specified earlier.

In a further embodiment, each polyethylene foam sheet 27 of the backing layer 24 is coupled with an elastic material 28. Such elastic material 28 is preferably a bi directional elastic material, such as spandex.

Figure 10:
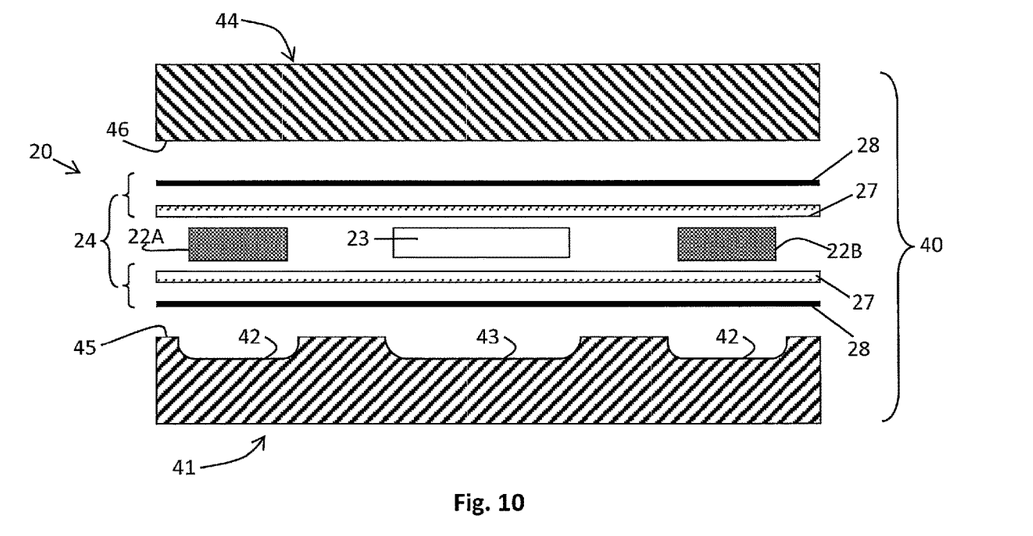
FIG. 10 schematically shows a possible method of manufacturing the first element of the sensing device according to the invention.

As it is shown in FIG. 10 and it will be clear from the following description, preferably the alignment component 22 and the activating component 23 are enclosed within the backing layer 24, namely within the two polymeric foam sheets 27, in case coupled with the elastic material 28. In this way, the backing layer 24 not only acts as support, but it also protects the components 22, 23 of the triggering element 20.

Preferably, the triggering element 20 is permanently fixed to the flap 11 of the opening 13.

Figure 8:
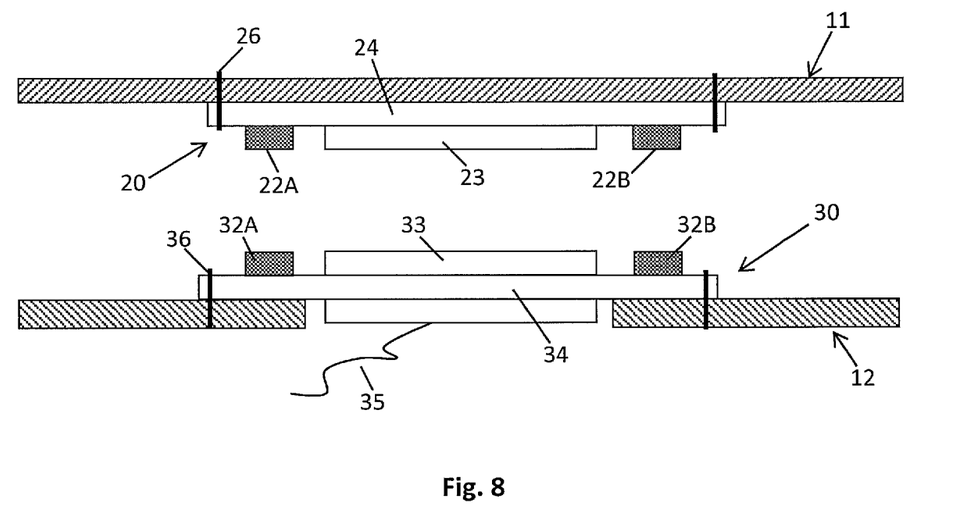
FIG. 8 shows a cross section of the first and second element of the sensing device taken along a longitudinal axis of the sensing device.
Figure 9:
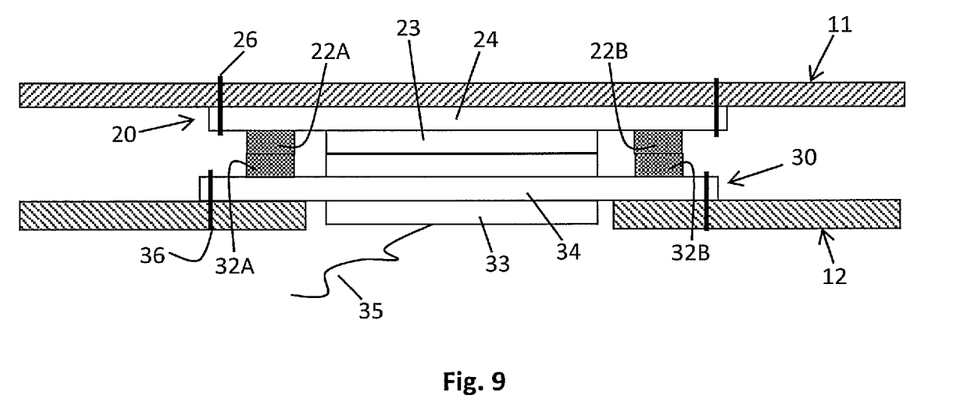
FIG. 9 shows a view similar to the one of FIG. 8 in a different operating condition.

According to the embodiment shown in FIGS. 8 and 9, the triggering element 20 might be fixed to the flap 11 by means of stitching 26. Alternatively, the triggering element 20 can be fixed to the flap 11 by using adhesive, heat bonding, ultrasonic welding or similar techniques suitable for affixing the element firmly in place.

Figure 3:
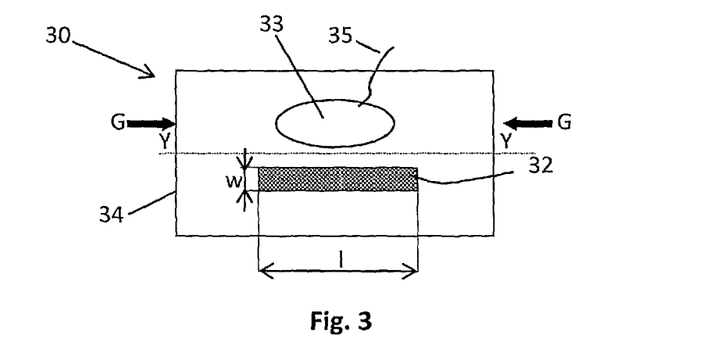
FIGS. 3 and 5 show schematic views of different embodiments of a second element of the sensing device according to the invention.
Figure 5:
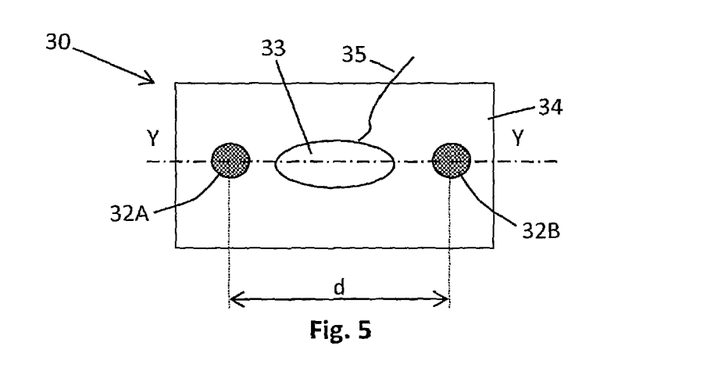

The structure of the switch element 30 is now disclosed, with reference to the FIGS. 3 and 5.

FIG. 3 shows a first embodiment of the switch element 30 suitable for being used in cooperation with the triggering element 20 of FIG. 2.

The switch element 30 comprises a sensing component 33 and one alignment component 32, respectively designed for cooperating with the activating component 23 and the alignment component 22 of the triggering element 20.

The sensing component 33 preferably has dimensions comparable with those of the activating component 23 and it is designed for being positioned on the switch element 30 along a direction substantially parallel to the longitudinal axis Y of the switch element 30.

The alignment component 32 in its turn can be positioned substantially parallel to the sensing component 33. Preferably the alignment component 32 has shape and dimensions comparable with those of the alignment component 22.

Preferably, the alignment component 32 has a rectangular shape with a length 1 and a width w.

FIG. 5 shows a second embodiment of the switch element 30 designed for being used in cooperation with the triggering element 20 of FIG. 4.

According to this embodiment the switch element 30 comprises a sensing component 33 and two alignment components 32A, 32B.

Preferably the alignment components 32A, 32B have a substantially circular shape with dimensions comparable with those of the alignment components 22A, 22B of the triggering element 20. The alignment components 32A, 32B can be positioned on the switch element 30 so that their centres lie on the longitudinal axis Y of the switch element 30, the centres being spaced apart of a fixed distance d.

Preferably, the sensing component 33 has shape and dimensions comparable with those of the activating component 23 and it is preferably positioned along the longitudinal axis Y of the switch element 30.

The sensing component 33 can be a wired sensor provided with a connecting wire 35, as it is shown in the attached figures. Alternatively, the sensing component 33 can be a wireless sensor.

In case the sensing component 33 is a magnetic proximity sensor, like for example a reed sensor or a Hall effect sensor, it will be put into operation by the magnetic activating component 23 provided on the triggering element 20.

As shown in FIGS. 2-5, the mutual position between the activating component 23 and each alignment component 22; 22A, 22B on the triggering element 20 preferably corresponds to the mutual position between the sensing component 33 and each alignment component 32; 32A, 32B on the switch element 30. In this way, when the alignment components interact to each other (in detail the component 22 interacts with the component 32 and the components 22A, 22B interact with the components 32A, 32B respectively), for example being made with magnetic material, the activating component 23 and the sensing component 33 are forced to be faced to each other so as to allow the sensing component 33 to emit an electrical output signal, for example, to an electrical equipment mounted on the wearable item (see FIGS. 8 and 9).

According to an embodiment of the invention, if the alignment components 22 of the triggering element 20 are magnetic, also the alignment components 32 are magnetic components.

In this case, the magnetic poles of the alignment components 32 are positioned in the switch element 30 so as to generate an inverted magnetic field with respect to the magnetic field generated by the alignment components 22 positioned on the triggering element 20. This is to ensure that when the triggering element 20 and the switch element 30 are brought together there is a North-South magnetic field coincidence so that the magnetic alignment components 22, 32 attract one another. Otherwise the magnets would repel one another not allowing a correct mutual positioning between the triggering element 20 and the switch element 30. Conversely, the magnetic activating component 23 of the triggering element 20 on the first flap 11 and the magnetic alignment component 32 on the second flap 12 are so mutual positioned that, when the first flap 11 is drawn close to the second flap 12, the magnetic activating component 23 is not stacked over a magnetic alignment component 32.

Also the switch element 30 comprises a backing layer 34 which has the function to retain the components of the switch element 30 in place. Preferably the backing layer 34 is made with at least two polymeric foam sheets coupled to each other; for example two polyethylene foam sheets 37.

Similarly to the backing layer of the triggering element 20, the backing layer 34 preferably is made with a sufficiently stiff material such that if a longitudinal force G is applied (see FIG. 3), it does not cause the element to bow excessively.

Experimental tests carried out by the applicant have shown that a thickness of the backing layer 34 comprised between 0.7-1.5 mm provides the stiffness specified earlier.

In a further embodiment, each polymeric foam sheet 37 is coupled with an elastic material 38. Such elastic material 38 preferably is a bi directional elastic material, such as spandex.

Figure 11:
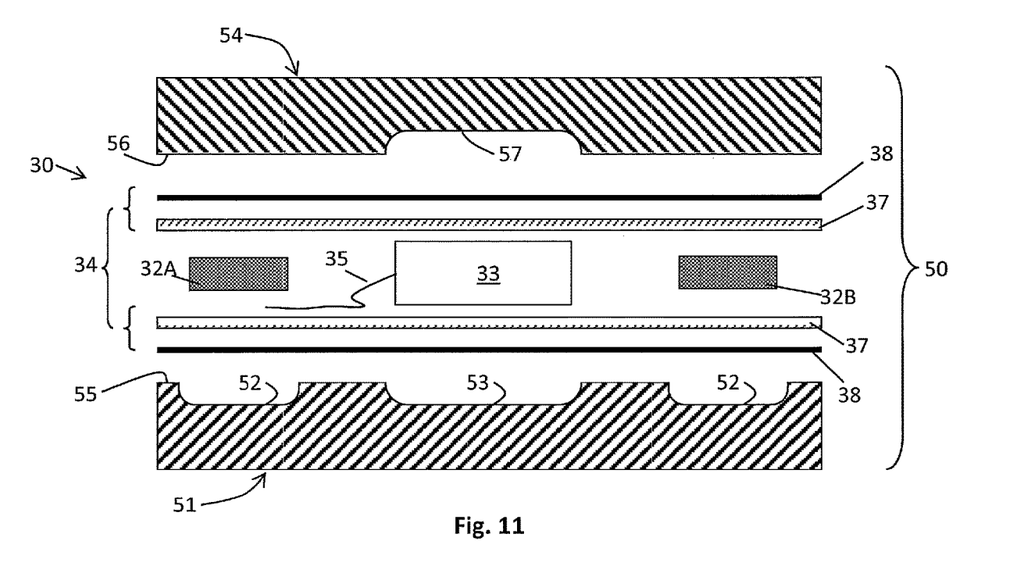
FIG. 11 schematically shows a possible method of manufacturing the second element of the sensing device according to the invention.

As it is shown in FIG. 11 and it will be clear from the following description, preferably the alignment component 32 and the sensing component 33 are enclosed within the backing layer 34. In this way, the backing layer 34 not only acts as support, but it also protects the components 32, 33 of the switch element 30.

Alternatively, the backing layer 34 can be provided with a seat, like for example a hole, inside which the sensing component 33 can be glued, stitched or clipped in a subsequent step.

According to the invention, it is possible to provide switch element 30 with more than two alignment components 32 or with two alignment components 32, having a different shape and orientation with respect to that shown in FIG. 5, in order to meet other specific needs.

Preferably, the switch element 30 is permanently fixed to the flap 12 of the opening 13.

According to the embodiment shown in FIGS. 8 and 9, the switch element 30 might be fixed to the flap 12 by means of stitching 36. Alternatively, the switch element 30 can be fixed by using adhesive, heat bonding, ultrasonic welding or similar techniques suitable for affixing the element firmly in place.

The functioning of the sensing device 10 according to the invention is now disclosed with reference to FIG. 6, wherein it is illustrated a sensing device comprising a triggering element 20 and a switch element 30 manufactured respectively according to the embodiments shown in FIGS. 4 and 5.

It is assumed for sake of clarity that the sensing component 33 is a reed sensor and that the alignment components 22A, 22B, 32A, 32B are magnetic components.

FIG. 6 illustrates a possible use of the sensing device of the invention positioned at the opening 13 of a garment 14, closed by means of a zip closure 15. In FIG. 6 the zip closure 15 is illustrated partially open.

A first row of zip teeth 19 is fixed along the edge of the first flap 11 and the second row of zip teeth 18 is fixed along the edge of the second flap 12. The first flap 11 can also be provided with an appendix 17 designed for covering the zip closure 15 from the inside of the garment 14.

The triggering element 20 and the switch element 30 are fixed close to opposite sides of the zip closure 15.

As the user starts to pull the zip slider 16 closed, the triggering element 20 and the switch element 30 are progressively brought together until the distance between the alignment magnets 22A, 22B, 32A, 32B is sufficiently reduced that their magnetic attraction will take over and autonomously and automatically pull the activating component 23 and the sensing component 33 towards one another, allowing the switch element 30 to emit a signal of "zip closed". In detail, the alignment magnet 22A will be attracted by the alignment magnet 32A and the alignment magnet 22B will be attracted by the alignment magnet 32B.

The main pull force of the alignment components 22; 22A, 22B; 32; 32A, 32B is directed along the z axis direction. However, as the alignment components 22; 22A, 22B; 32; 32A, are pulled together, advantageously they are also correctly oriented in the x, y directions since the magnetic field will autonomously and automatically force the alignment components 22; 22A, 22B; 32; 32A, to stack perfectly centrally on top of one another.

FIGS. 8 and 9 illustrate this effect. The end result is that the activating component 23 and the sensing component 33, when the zip closure 15 is closed, become perfectly aligned one on top of the other, guaranteeing that a continual "zip closed" signal is sent to an electronic equipment, for example, the central unit of an air bag mounted on the garment 14, regardless of how the user moves his neck, or how loosely he wears the garment.

When the user wants to remove the garment 14 afterwards, he can simply open the zip as he would do for removing any normal garment. When this happens the triggering element 20 and the switch element 30 will start to be pulled apart, but the magnetic attraction between the alignment components 22; 22A, 22B; 32; 32A is such that with an almost imperceptible force the elements 20, 30 will separate and a 'zip open' signal will be sent to the electronic equipment of the garment 14. No further unfastening actions are required to the user.

An additional advantage of the present invention is that the mutual arrangement of the alignment components 22, 32, of the activating component 23 and of the sensing component 33 is always precise. This means that even if the activating component 23 and the sensing component 33 are not mounted inside the garment 14 in perfect alignment, provided that the error is no more than 2 or 3 mm, the attraction force between the alignment components 22, 32 is such that the activating component 23 and the sensing component 33 can self-correct this offset and guarantee a proper functioning of the sensing device 10.

This allows overcoming the problems related to the normal tolerances involved in the positioning of the triggering element 20 and switch element 30 on the flaps of the opening.

Moreover, even if in FIG. 6 a zip closure 15 is shown, the sensing device 10 of the present invention can be easily used in conjunction with other closing means designed for closing the opening 13, for example hook-and-loop fasteners, snap fasteners and buttons.

Furthermore, in the embodiment shown in FIG. 6, the switch element 30 is mounted directly on the outer surface of the garment 14. However, the switch element 30 can also be mounted in a pocket or on a flap which runs parallel to the edge of the opening.

Additionally, it is also possible to mount the triggering element 20 and the switch element 30 reversed such that the triggering element 20 is on the outer surface of the garment 14 and the switch element 30 is on the flap 11 or on the appendix 17 thereof.

It should be noted that the placement of the sensing device 10 along the track of the zip closure can be varied depending on how much the opening must be closed in order to send the "zip closed" to the electronic equipment of the garment.

In FIG. 6 the triggering element 20 and the switch element 30 are mounted at the top end of the zip closure, requiring that the zip is completely or almost completely closed for supplying a "zip closed" signal. Obviously, if the triggering element 20 and the switch element 30 are placed at a lower position on the zip closure, the user can leave open the top part of the zip (for example to provide some ventilation) and at the same time a "zip closed" signal can be sent to the electronic equipment.

Now, with reference to FIGS. 10-11, the method for manufacturing the triggering element 20 or the switch element 30 of the sensing device 10 is disclosed.

The method comprises the following steps:

arranging a mould 40; 50 having a base 41; 51 and a cover 44; 54; the base 41; 51 being provided with at least one first cavity 42; 52 having shape and dimensions designed for housing the at least one alignment component 22; 32;

placing on the upper surface 45; 55 of the base 41; 51 a first polymeric foam sheet 27; 37;

positioning the at least one alignment component 22; 32 over the first polymeric foam sheet 27; 37 so as to match the first cavity 42; 52;

placing over the at least one alignment component 22; 32 a second polymeric foam sheet 27; 37;

closing the mould 40; 50 by lowering the cover 44; 54 onto the base 41; 51;

heating the mould 40; 50 to shape the first and second polymeric foam sheets 27; 37 so as to enclose, between the polymeric foam sheets 27; 37, the at least one alignment component 22; 32 in the first cavity 42; 52;

opening the mould 40; 50 for extracting the moulded assembly;

cutting the moulded assembly to the required shape and dimensions for obtaining the triggering element 20 or the switch element 30.

In case the above method is used for manufacturing the triggering element 20, the base 41 of the mould 40 can advantageously comprises a second cavity 43 having shape and dimension designed for housing the activating component 23.

In this way, the activating component 23 might be positioned together with the alignment components 22 over the first polymeric foam sheet 27, so as to match the second cavity 43 and, after the heating step, to be enclosed between first and second polymeric foam sheets 27 in the second cavity 43.

In case the method of the invention is used for manufacturing the switching element 30, the base 51 of the mould 50 advantageously comprises a second cavity 53 and the cover 56 of the mould 50 comprises a corresponding recess 57 designed for being superimposed on the second cavity 53 when the mould 50 is closed.

As it is shown in FIG. 11, the second cavity 53 and the recess 57, once the mould 50 is closed, defining an accommodation suitable for housing the sensing component 33.

In this way (see FIG. 11), the sensing component 33 can be positioned together with the alignment components 32 over the first polymeric foam sheet 37 so as to match the second cavity 53.

Consequently, after the heating step, the sensing component 33 can also be enclosed between first and second polymeric foam sheets 37 in the accommodation defined by the second cavity 53 and the recess 57. In case the sensing component 33 is wired, such accommodation also houses the wires 35.

As schematically shown in the figures, it should be noted that first cavities 42, 52, second cavities 43 and the accommodation formed by the second cavity 53 and the recess 57, have dimensions slightly larger than those of the components 22, 32, 23, 33, 35 that are inserted therein, in order to accommodate the thickness of the first and second polymeric foam sheet 27, 37.

Alternatively, in case the method of the invention is used for manufacturing the switch element 30, the method can comprise a step of providing, concurrently with the cutting step, a seat in the first and second polymeric foam sheet 37 for housing the sensing component 33.

In this way, it is thus not needed for the sensing component 33 to be enclosed between first and second polymeric foam sheets. As a matter of fact, the sensing component 33 will be applied to the switch element at a later stage.

The seat can be for example a hole.

The heating step of the method for manufacturing the triggering element 20 or the switch element 30 is preferably performed at a temperature comprised between 75°-85° C., more preferably at a temperature of about 80° C.

Such temperature does not affect the magnetic properties of the components of the triggering element 20 and switch element 30.

Preferably, the closing step and the heating step are performed for shaping the first polymeric foam sheet 27, 37 and the second polymeric foam sheet 27, 37 so as to obtaining a backing layer 24, 34 having a thickness comprised between 0.7-1.5 mm.

Such thickness has been found by the applicant to be the thickness suitable for supplying to the triggering element 20 and to switch element 30 the desired stiffness.

Furthermore, as above specified, it should be noted that the backing layer 24, 34 of both triggering element 20 and switch element 30 can comprise an elastic layer 28, 38.

In this case, a first elastic layer 28, 38 can be positioned between the upper surface 45; 55 of the base 41; 51 and a first polymeric foam sheet 37 and a second elastic layer 28, 38 can be positioned over the second polymeric foam sheet 27, 37.

In this way, the elastic layer 27, 37 during the heat step will be joined to the polymeric foam sheet and it will enclose the components of the triggering element 20 or of the switching element 30.

Advantageously, the first and the second elastic layer 28, 38 might be coupled to first and second polymeric foam sheets respectively so as to form a single sheet that will be placed over the base 45, 55 of the mould 41, 51 and over the components 22, 23, 32, 33.

From the above description it is clear that the sensing device 10 and the method for manufacturing said sensing device according to the present invention have characteristics suitable to advantageously solve the problems and drawbacks set out in the prior art.

In particular, by using the sensing device 10 above described, it is possible to receive a reliable signal that the opening is actually closed.

The provision of alignment components able to block the triggering element in a predetermined mutual position with respect to the switch element when the opening is closed, makes less likely that false positive signals or false negative signals are randomly emitted.

Moreover, the sensing device is easy to operate, since the alignment between the triggering element and the switch element is obtained autonomously without needing any actions of the user.

Furthermore, the triggering element and the switch element are positioned in portions of the opening not hindering the user of the wearable item.

Finally, it is clear how the sensing device according to the invention can be used advantageously with different types of garment and in cooperation with different types of closure device.

The present invention has been described with reference to a preferred embodiment, but mechanically equivalent solutions are foreseeable falling within the scope of the following claims.

The invention claimed is:

1. A sensing device positionable on a first flap and a second flap of a wearable item, the first and second flaps when separated defining an opening, comprising:
   a triggering element arranged on the first flap and comprising an activating component; and
   a switch element arranged on the second flap and comprising a sensing component; the sensing component configured to emit an electrical output signal when moved to a predetermined mutual position relative to the activating component;
   characterized in that the triggering element is provided with at least one alignment component designed for interacting with a corresponding alignment component of the switch element so as to autonomously and automatically set said predetermined mutual position for the activating component and the sensing component based on the first flap being drawn toward the second flap, or the second flap being drawn toward the first flap.

2. The sensing device according to claim 1, characterized in that the at least one alignment component of the triggering element and the at least one alignment component of the switch element have comparable shape and dimensions.

3. The sensing device according to claim 1, characterized in that the activating component and the at least one alignment component on the triggering element in the predetermined mutual position correspond to the sensing component and the at least one alignment component on the switch element in the predetermined position.

4. The sensing device according to claim 1, characterized in that the at least one alignment component of the triggering element and the at least one alignment component of the switch element are magnetic components.

5. The sensing device according to claim 4, characterized in that magnetic poles of the at least one alignment component are positioned on the triggering element for generating an inverted magnetic field with respect to a magnetic field generated by the at least one alignment component positioned on the switch element.

6. The sensing device according to claim 1, characterized in that the triggering element and the switch element further comprise a backing layer for retaining in corresponding place the activating and at least one alignment components with the sensing and alignment components; said backing layer having a thickness in a range of between 0.7 mm and 1.5 mm.

7. The sensing device according to claim 1, characterized in that the activating component is a magnetic component and the sensing component is a magnetic proximity sensor.

8. The sensing device according to claim 6, characterized in that the backing layer is provided with a seat to house the sensing component; the sensing component being one of glued, clipped, or stitched inside said seat.

9. A closure device in combination with the sensing device of claim 1, the sensing device positioned on the wearable item with the first and second flaps which are selectively joined or separated to form the opening, a first element of the closure device being fixed on the first flap and a second element of the closure device being fixed on the second flap; the first element and the second element of the closure device configured to be selectively drawn close together or apart by means of a fastening element;

characterized in that the triggering element and the switch element are positioned on opposing of the first and second flaps at predetermined positions, so that when the fastening element is moved so as to draw close together a portion of the first element with a portion of the second element, such that the sensing element can sense the activating element, the sensing device emits a signal that the opening has reached a predetermined closed position.

10. The closure device according to claim 9, characterized in that the closure device is one of a zip closure, a hook-and-loop closure, or a button closure.

11. A method for manufacturing the triggering element or the switch element of the sensing device according to claim 1, the method comprising the following steps:

arranging a mould having a base and a cover; the base being provided with at least one first cavity having shape and dimensions designed for housing the at least one alignment component;

placing on an upper surface of the base a first polymeric foam sheet;

positioning the at least one alignment component over the first polymeric foam sheet so as to match the first cavity;

placing over the at least one alignment component a second polymeric foam sheet;

closing the mould by lowering the cover onto the base;

heating the mould to shape the first and second polymeric foam sheets so as to enclose, between the polymeric foam sheets, the at least one alignment component in the first cavity;

opening the mould for extracting a moulded assembly; and cutting the moulded assembly to shape and dimensions for obtaining the triggering element or the switch element.

12. The method he according to claim 11, characterized in that the base of the mould comprises a second cavity having shape and dimension designed for housing the activating component; the activating component being positioned together with the at least one alignment component over the polymeric foam sheet, so as to match the second cavity and, after a heating step, to be enclosed between the first and second polymeric foam sheets in the second cavity.

13. The method according to claim 11, characterized in that the base of the mould comprises a second cavity and the cover of the mould comprises a corresponding recess that is superimposable on the second cavity when the mould is closed; the second cavity and the recess, once the mould is closed, defining an accommodation suitable for housing the sensing component.

14. The method according to claim 11, characterized in that the heating step is performed at a temperature in a range of between 75° and 85° C.

15. The method according to claim 11, characterized in that the closing step and the heating step result in shaping the first polymeric foam sheet and the second polymeric foam sheet so as to obtain a backing layer having a thickness in a range of between 0.7 mm and 1.5 mm.

16. The sensing device according to claim 7, characterized in that the magnetic proximity sensor is one of a reed sensor or a Hall Effect sensor.

17. The method according to claim 14, characterized in that the heating step is performed at a temperature of 80° C.

* * * * *